(12) United States Patent
Pickering et al.

(10) Patent No.: US 9,679,034 B2
(45) Date of Patent: Jun. 13, 2017

(54) METHOD AND APPARATUS FOR OPERATING A COMPUTER-TELEPHONY SYSTEM

(75) Inventors: Richard Pickering, Basingstoke (GB); Ashley Unitt, Basingstoke (GB); Dan Phipps, Basingstoke (GB)

(73) Assignee: NEW VOICE MEDIA, LTD., Hampshire (GB)

( * ) Notice: Subject to any disclaimer, the term of this patent is extended or adjusted under 35 U.S.C. 154(b) by 1481 days.

(21) Appl. No.: 12/444,115

(22) PCT Filed: Oct. 2, 2007

(86) PCT No.: PCT/GB2007/003728
§ 371 (c)(1),
(2), (4) Date: Nov. 9, 2009

(87) PCT Pub. No.: WO2008/040954
PCT Pub. Date: Apr. 10, 2008

(65) Prior Publication Data
US 2010/0128717 A1    May 27, 2010

(30) Foreign Application Priority Data
Oct. 3, 2006   (GB) .................................. 0619520.0

(51) Int. Cl.
| | |
|---|---|
| *H04L 12/66* | (2006.01) |
| *H04M 15/00* | (2006.01) |
| *G06F 17/30* | (2006.01) |
| *G06Q 30/00* | (2012.01) |
| *H04M 3/42* | (2006.01) |

(Continued)

(52) U.S. Cl.
CPC ..... *G06F 17/30569* (2013.01); *G06Q 30/016* (2013.01); *H04M 3/42017* (2013.01); *H04M 3/5166* (2013.01); *H04M 3/5191* (2013.01); *H04M 3/382* (2013.01);

(Continued)

(58) Field of Classification Search
CPC .............................. G06Q 20/10; H04M 3/523
See application file for complete search history.

(56) References Cited

U.S. PATENT DOCUMENTS

| | | |
|---|---|---|
| 2,656,609 A | 10/1953 | Siggson |
| 6,014,647 A | 1/2000 | Nizzari |

(Continued)

FOREIGN PATENT DOCUMENTS

| | | |
|---|---|---|
| EP | 1241596 A2 | 9/2002 |
| EP | 1684192 A1 | 1/2005 |

(Continued)

*Primary Examiner* — Melanie Jagannathan
(74) *Attorney, Agent, or Firm* — Galvin Patent Law LLC; Brian R. Galvin

(57) ABSTRACT

One embodiment of the invention provides a method of operating a computer-telephony system. The method comprises providing computer-telephony support for a plurality of customers. Each customer maintains customer relationship management (CRM) data. The CRM data is uploaded from the plurality of customers into a computer-telephony database. The uploading includes transforming the CRM data from an original format maintained by the respective customer into a standardized format for the computer-telephony database. Telephone calls can then be handled using the transformed CRM data in the computer-telephony database.

16 Claims, 3 Drawing Sheets

(51) Int. Cl.
*H04M 3/51* (2006.01)
*H04M 3/38* (2006.01)

(52) U.S. Cl.
CPC .... *H04M 3/42042* (2013.01); *H04M 3/42102* (2013.01); *H04M 2203/6018* (2013.01); *H04M 2242/22* (2013.01)

(56) References Cited

U.S. PATENT DOCUMENTS

| | | | |
|---|---|---|---|
| 8,045,697 B1* | 10/2011 | Martin | G06Q 20/10 379/265.12 |
| 2002/0140731 A1* | 10/2002 | Subramaniam et al. | 345/762 |
| 2003/0231747 A1 | 12/2003 | Creamer | |
| 2004/0125939 A1 | 7/2004 | Drobek | |
| 2006/0056609 A1* | 3/2006 | Dickey | 379/126 |
| 2006/0161550 A1* | 7/2006 | Carini et al. | 707/10 |
| 2007/0078950 A1* | 4/2007 | Hopkins et al. | 709/217 |

FOREIGN PATENT DOCUMENTS

| | | |
|---|---|---|
| EP | 1684192 A1 | 7/2009 |
| JP | 2006180028 A | 6/2006 |
| WO | WO97/38519 A | 10/1997 |
| WO | WO99/17517 | 8/1999 |
| WO | 2006060579 A2 | 6/2006 |
| WO | WO2006/060579 A2 | 8/2006 |

* cited by examiner

METHOD AND APPARATUS FOR OPERATING A COMPUTER-TELEPHONY SYSTEM

FIELD OF THE INVENTION

The invention relates to a method and apparatus for operating a computer-telephony system, in particular in a service provider environment.

BACKGROUND OF THE INVENTION

FIG. 1 is an illustration of a conventional computer-telephony integration (CTI) system. An incoming call 60 is received by a switch 90. The switch passes information about the call to a CTI server 80. The information passed may include, for example, the calling line identification (CLI), sometimes known as automatic number identification (ANI), and/or the dialed number identification. Switch 90 is also provided with an interactive voice response (IVR) unit 95 which may be used to obtain additional information from the caller, for example an account number or such like. This additional information may also be passed to CTI server 80. In some implementations, various messages may be played to the caller as part of the initial call handling, for example to allow a caller to specify the type of desired action—e.g. make a new booking, amend a previous booking, or some other query. Caller input in response to this information can then be used subsequently in determining how to handle the call.

The switch 90 routes the call through the telephone network 101 to a telephone 121 belonging to an agent 120. For example, the switch may route a particular incoming call 60 to agent 120B having telephone 121B. The CTI server 80 may instruct the switch 90 which particular agent to forward the incoming call to. In other implementations, the switch 90 may make this decision through some other mechanism, such as agent availability (and notify the CTI server 80 accordingly).

In addition to telephone 121, each agent 120 is also provided with a workstation 122. The CTI server 80 has access to a customer relationship management (CRM) database 70. The CTI server 80 can use information about a particular call provided by switch 90 to look up information relating to the caller in the CRM database 70. For example, this information may represent the name and address of a party associated with a particular calling line identification, as well as any information about previous orders that this person may have made, and so on. The CTI server 80 can then provide this information to the workstation 122 associated with the agent 120 who receives the call in order to assist the agent in handling the caller. For example if the incoming call 60 is to be routed to telephone 121B of agent 120B, then the CTI server accesses information about the caller from CRM database 70 and forwards this information to corresponding workstation 1223B.

If no agent is free to handle incoming call 60, switch 90 may put the caller in a queue. While the caller is in this queue, the switch may provide the caller with marketing messages, information about queue status, and so on. These messages may be sourced from IVR 95 or switch 90 itself.

In some circumstances, the call may be handled automatically without having to reach an agent 120. For example, a caller may ring to obtain an account balance. The IVR system 95 may be able to obtain the account number from the caller, perform appropriate security checks (e.g. accepting an input PIN), access the account balance from a server 201 via a link (not shown) between IVR 95 and computer network 102, and then play out the relevant balance to the caller.

Call centres having CTI such as shown in FIG. 1 have been around for many years. In many cases the system shown in FIG. 1 is internal to a particular organisation. In other words, switch 90 represents a PBX and telephone network 101 represents the internal telephone network of the organisation. Likewise computer network 102 represents the internal computer network (e.g. intranet) of the organisation.

It is also very common for organisations to outsource CTI and/or call centre operations to some third party. This strategy may be adopted by very small organisations, which may only have one incoming telephone line, as well as by larger organisations. In such cases in the architecture of FIG. 1, the switch 90 may be located within the public switch telephone network (PSTN)—i.e. telephone network 101 may be part of the PSTN. Likewise computer network 102 may be the internet or some other public computer network.

One problem with this third party call centre model concerns the provision of access for the CTI service provider to the CRM database of the client (i.e. the organisation for whom the hosted telephone service is being provided). For example, the CTI server may now have to support access to potentially multiple different CRM database formats for multiple different clients, adding significantly to the cost and complexity of the CTI server itself.

SUMMARY OF THE INVENTION

Accordingly, one embodiment of the invention provides a method of operating a computer-telephony system. The method comprises providing computer-telephony support for a plurality of customers, wherein each customer maintains customer relationship management (CRM) data. The CRM data from each customer is uploaded into a computer-telephony database. This uploading includes transforming the CRM data from an original format maintained by the respective customer into a standardised format for the computer-telephony database. The system subsequently handles telephone calls using the transformed CRM data in the computer-telephony database.

Such an approach allows a service provider to support telephone calls for different customers using the CRM data appropriate for any given customer. However, by transforming the CRM data for all the different customers from an original or native format (as maintained by the customer itself) into a standardised format, the computer telephony system avoids the complexities of having to provide direct support for multiple different CRM data formats.

In one embodiment, the computer-telephony database further includes a configuration database describing the CRM data. The transforming may be performed in accordance with information in the configuration database. In one particular embodiment, the configuration database includes a web interface, and wherein the information in the configuration database can be provided or modified via the web interface. The web interface allows customers to update the configuration information themselves. Accordingly, if a customer changes the format of their CRM data, they can make a corresponding update to their configuration information to reflect this change. This facility therefore avoids the service provider itself having to make any updates to the format of the stored CRM data in the computer telephony system.

In one embodiment, one or more script questions can be uploaded into the computer-telephony database, for example via the web interface. These script questions can then used in the handling of telephone calls. For example, a script question from the database can be displayed on the screen of an agent who is handling a call. The agent then reads the question out to the caller, and the response from the caller may be entered via the screen for capture into the database (if so desired). This facility makes it easy and quick for customers to develop and upload their own applications to run on the computer-telephony system, since the script questions for use in the application are treated in effect as another form of data (along with the CRM data) to upload and store into the computer-telephony database.

In one embodiment, the uploaded CRM data includes spreadsheet data. Thus some customers, particularly smaller organisations, may not maintain their own CRM database, but rather may employ some simpler facility, such as a spreadsheet, for holding customer data. The spreadsheet data can be imported into the computer-telephony database. Accordingly, the computer-telephony system is very flexible and supports a wide range of different customer data formats (rather than trying to impose a predetermined data format onto customers).

In one embodiment, the method further comprises providing a call database. Information about telephone calls handled by the computer-telephony system is stored into the call database. The stored information about the handling of a previous telephone call can be used to determine the handling of a current call, either by the computer telephony system itself, and/or by and agent to whom the call is allocated for processing.

Another embodiment of the invention provides a computer-telephony system for providing computer-telephony support for a plurality of customers. Each customer maintains customer relationship management (CRM) data. The system comprises a computer-telephony database for storing CRM data from different customers in a standardised format. The system further comprises an upload mechanism for uploading CRM data from the plurality of customers into the computer-telephony database. This uploading includes transforming the CRM data from an original format maintained by the respective customer into the standardised format for the computer-telephony database. The system is configured to handle telephone calls using the transformed CRM data in the computer-telephony database.

From one perspective, an embodiment of the present invention can be viewed as providing a fourth generation CTI system. Thus the first generation of CTI systems were mainframe based; the second generation of CTI systems were client-server based; and the third generation of CTI systems were network based—i.e. located in a network as a service provider environment facility rather than on customer premises. However, these earlier generations all generally imposed a predefined API onto customers for application development and CRM data upload. In contrast, the fourth generation system described herein adopts a flexible approach to data integration, whereby a wide range of customer data formats are supported, both at a database level, and also at a non-database level, such as spreadsheets, word processor files, and so on. These customer data formats are then transformed into a standardised format for use in computer-telephony applications.

BRIEF DESCRIPTION OF THE DRAWINGS

Various embodiments of the invention will now be described in detail by way of example only with reference to the following drawings.

DETAILED DESCRIPTION

Figure 1:
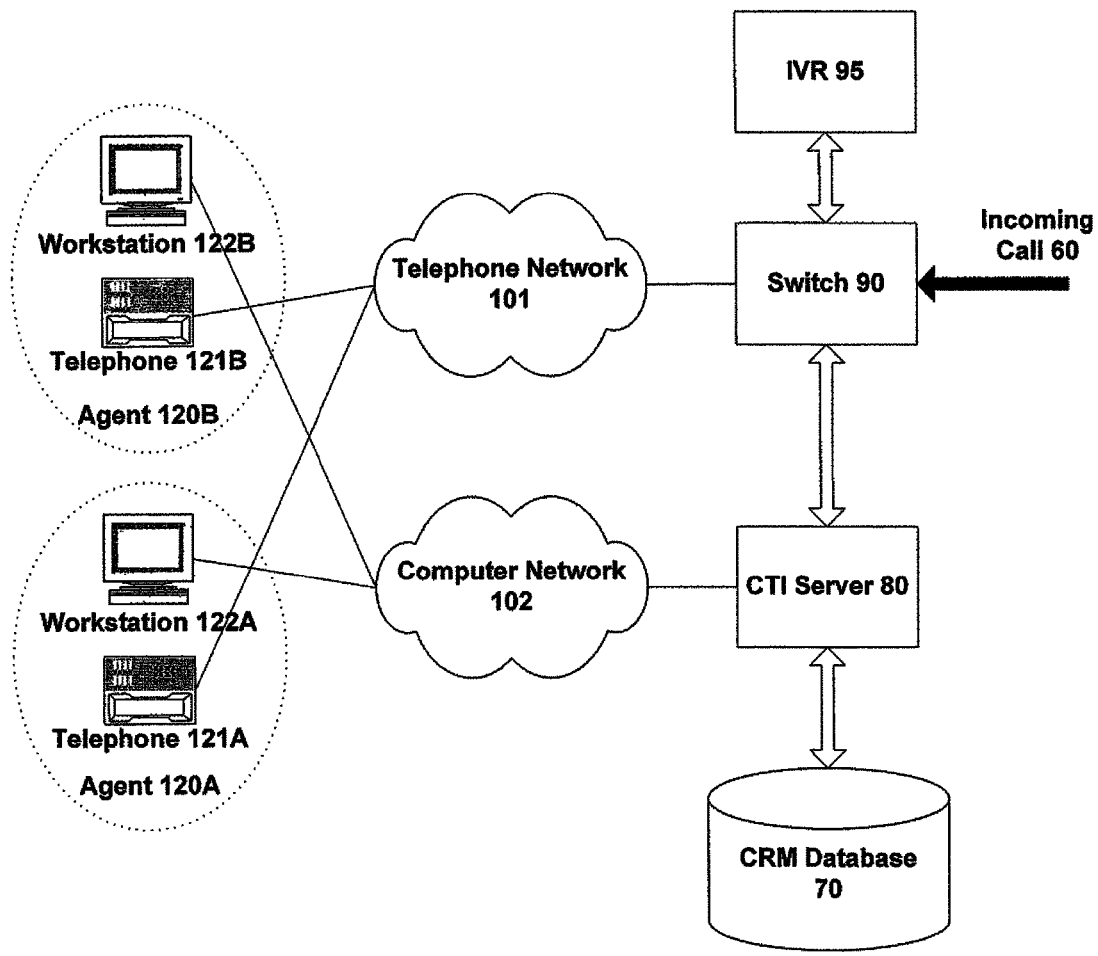
FIG. 1 is a schematic diagram of a known CTI system.
Figure 2:
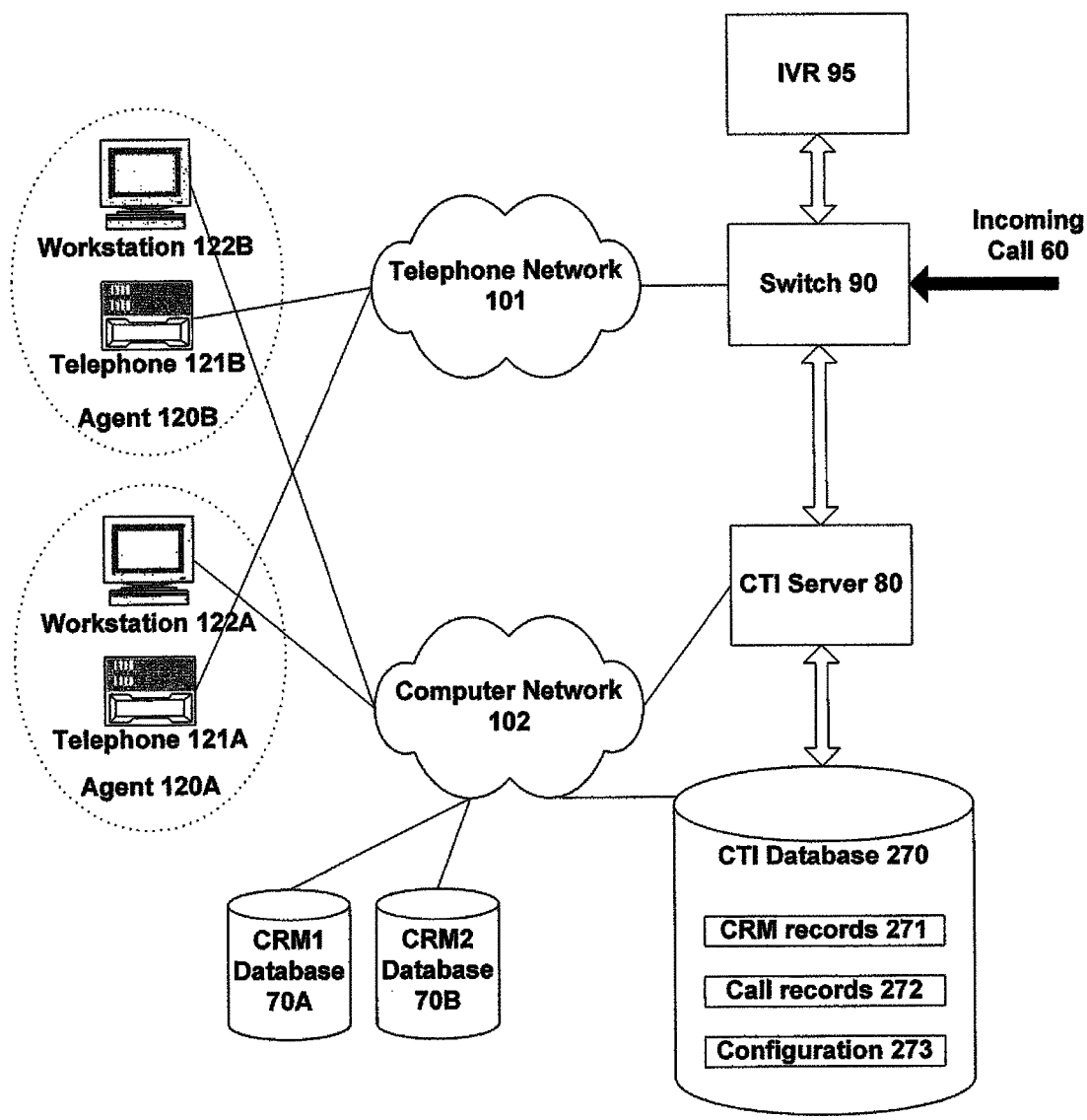
FIG. 2 is a schematic diagram of a CTI system in accordance with one embodiment of the invention.

FIG. 2 is an illustration of the CTI system in accordance with one embodiment of the invention. Components that are the same as existing systems such as shown in FIG. 1 will not be described further. In the system of FIG. 2, the CTI server 80 operates in a service provider environment (SPE), in which the service provider has various customers, generally businesses or other organisations. The service provider, which may be the telephone network operator or some third party, handles incoming calls for these customers.

The system of FIG. 2 includes CTI database 270 which contains three separate groupings of records, namely CRM records 271, call records 272, and configuration records 273. Although CTI database 270 is shown in FIG. 2 as a single database, it may be implemented across multiple physical systems according to the particular needs of any given installation. The CTI server 80 interacts with the CTI database 270 to handle incoming calls 60. The CTI server 80 and the CTI database 270 are run by the service provider.

The CRM records in CTI database 270 are uploaded from the CRM databases of the various customers of the service provider. For example, the service provider may have a first customer that maintains a CRM database CRM1, 70A, and a second customer that maintains a CRM database CRM2, 70B. It will be appreciated that although FIG. 2 depicts only two customer CRM databases, in practice the service provider may support CRM databases from a larger number of customers. Furthermore, the CRM records 271 in CTI database 270 will generally be segregated by customer. In other words, CRM records from CRM database 70A are maintained in a separate table, database or data structure from the CRM records from CRM database 70B. CTI database 270 therefore represents a multi-tenant network database, in that it contains data from multiple different customers (tenants) that is provided to (and from) the database over network 102.

The uploading operation may be performed, for example, by import/export using comma separated variable (CSV) data, a simple object access protocol (SOAP) interface, or any other suitable mechanism. A different upload mechanism may be used with different CRM databases 70A, 70B, etc. A CRM record 271 that has been updated following an incoming call 60 may then be downloaded back to the corresponding CRM database 70. The timing of the upload and download can be arranged as required. For example, data transfer (synchronisation) operations may be performed each night, or may occur on an ongoing basis during the day.

There are various reasons why CTI server 80 does not use the customer CRM databases 70A, 70B, etc directly. One of these is that a CRM database generally contains sensitive information. A customer may upload only selected information from a CRM database 70 into CRM records 271, so that the service provider does not have access to all of the information in CRM database 70 (but rather only the information necessary for call handling). In addition, since the CTI server 80 utilises a copy of the CRM database 70, the customer avoids the risk of CTI server 80 corrupting or otherwise damaging the main CRM database 70. A further issue is that the CTI server 80 has to be able to handle an incoming call 60 in real-time. By maintaining its own copy of the CRM records 271 in CTI database 270, the CTI service provider can obtain much better control of response times to access the CTI database. For example, if the CTI service provider had to access CRM database 70A, or 70B in real-time, there might be delays due to bandwidth issues, or perhaps because the customer was performing some maintenance or upgrade on the CRM database.

The CTI database also maintains a set of call records 272. Thus details of each incoming call 60 are stored in CTI database 270 as part of the call records. The information stored in call records 272 may comprise data such as date and time, dialed number and CLI, length of time in the queue, agent who handled the call, plus information acquired by the agent and/or an IVR, such as account number, etc. This information can then be used in determining how to handle or process the call, whether by CTI server 80 and/or by an agent who receives the call. For example, the CLI for a new incoming call may correspond to an earlier call listed in call records 272 that was not completed due to the unavailability of an agent at that time. The CTI server 80 may respond to this circumstance by giving the new incoming call a relatively high priority. The CTI may also opt to forward the call to an agent who has previously handled a call having the same CLI. An agent who is handling the call may also access the call records 272 to better understand the history between the caller and the customer.

The CTI database 270 further includes configuration records 273. The configuration records allow a customer to specify the structure of the CRM records 271. Thus one of the difficulties for a service provider is that it has to deal with potentially multiple different CRM databases 70A, 70B, etc, each of which may have its own format, configuration, etc for storing data. In known systems, the CTI server 80 has generally interacted either directly with these different CRM databases, or with copies of the different CRM databases. However, in the system of FIG. 2, the CRM records 271 are not merely a straight copy of data from CRM databases 70A, 70B, but rather represent a reformatting and re-configuration of the data into a single consistent structure. In other words, when data is imported into CTI database 270, it is transformed from the native format of CRM database 70A, 70B, or whatever, into a format specified by CTI database 270.

As an example, one CRM database 70A may store a telephone number as a character string, while another CRM database 70B may store a telephone number as an integer. Likewise, one CRM database 70A may store a telephone number as two separate fields, one field representing the area code and the other field the remainder of the telephone number, while another CRM database 70B may store a telephone number as a single overall field. A single consistent format is specified for CTI database 270, for example, a single field containing a character string. Accordingly, the upload process from database 70A would combine the character strings from the two fields to produce a single field to store in CRM records 271, while the upload process from database 70B would convert the numerical digit string for the telephone number into a character string to store in CRM records 271. Applications running on the CTI server 80 would then be designed to work with telephone numbers as a single character string, without having to worry about other possible formats.

The CTI database 270 can also impose consistent terminology on data fields. For example, CRM database 70A may store a "work telephone" and a "home telephone", while CRM database 70B may store a "day telephone" and an "evening telephone". The CTI database 270 might adopt the latter terminology, so that "work telephone" and a "home telephone" from CRM database 70A would be mapped to "day telephone" and an "evening telephone" respectively in CRM records 271 during the import process.

One benefit of the above approach is that the data in CTI database 270 has a single consistent format irrespective of which CRM database it originates from. This makes it much quicker and more efficient to develop applications on CTI server 80, since existing applications for one customer can be readily modified to work for another customer, without having to worry about data compatibility issues. Furthermore, shared applications do not have to worry about performing data conversions for input/output data, which again improves efficiency.

Another benefit of the consistent structure of CRM records 271 is that it supports customers (typically smaller organisations) that may not maintain their own CRM database 70. For example, such customers may maintain a listing of their clients in a spreadsheet, a word processing document, and so on. The data from such files can be imported into CTI database 270 as part of CRM records 271 for use in call handling on behalf of that customer. Conversely, any data obtained by the CTI server 80 as a result of processing a telephone call may be exported back to the customer (e.g. from CTI database 270) in the form of a spreadsheet. It can be seen therefore that the computer-telephony system of the present invention is very flexible and can support a wide range of customer data formats.

Although the CTI database 270 imposes a consistent format on CRM records 271, it will be appreciated that records for different customers may contain different fields. For example, a customer who runs an insurance firm may maintain information concerning the next renewal date for its clients. The CTI database 270 may specify that this date information conforms to a standardised format for all dates in CRM records 271. However, CRM records 271 for other customers, for example for pizza ordering service, would not have a field corresponding to new renewal date. Thus the CTI database 270 ensures a consistent format to the data stored in the database across all customers, but the data content itself may vary from one customer to another.

The configuration database 273 is used to specify the mapping or transformation from the native or original data format in a customer CRM database 70 into the standardised format of CRM records 271. This includes specifying the fields and data structures of the CRM records 271. Accordingly, the configuration information 273 is used by the upload process to import data from a customer CRM database 70 into the CTI database 270. The configuration database may also be used by applications running on the CTI server 80 in order to access and manipulate the CRM records 271. Note that the stored configuration information 273 is generally different for each customer, to reflect the different format and content of data stored in any given customer CRM database 70A, 70B, as well as the particular application needs for any given customer.

In one implementation, the configuration database 273 is provided with a web interface. This allows the customers themselves to provide or modify the data stored in the configuration database 273. Accordingly, it may then become the responsibility of the customer rather than the service provider to keep the configuration database current. For example, if a customer makes a modification to the structure or format of their CRM database 70, the customer can use the web interface to provide a corresponding update to the configuration information 273 in CTI database 270 without the need for any direct involvement of the service provider itself.

In one embodiment, the web interface can also be used to upload script questions into CTI database 270. These script questions are then used by an application running on CTI server 80 to provide a screen prompt to an agent 120 handling a call. For example, a customer might upload questions such as "Please tell me your account number" into CTI database 270. The application processing a call retrieves this question and places it onto the workstation screen 122 of the agent 120 handling the call. The agent then enters the response provided by the caller into an appropriate portion or box on the workstation screen 122, thereby allowing the application to capture the account number provided by the caller and save it into the CRM record 271 for that caller.

Figure 3:
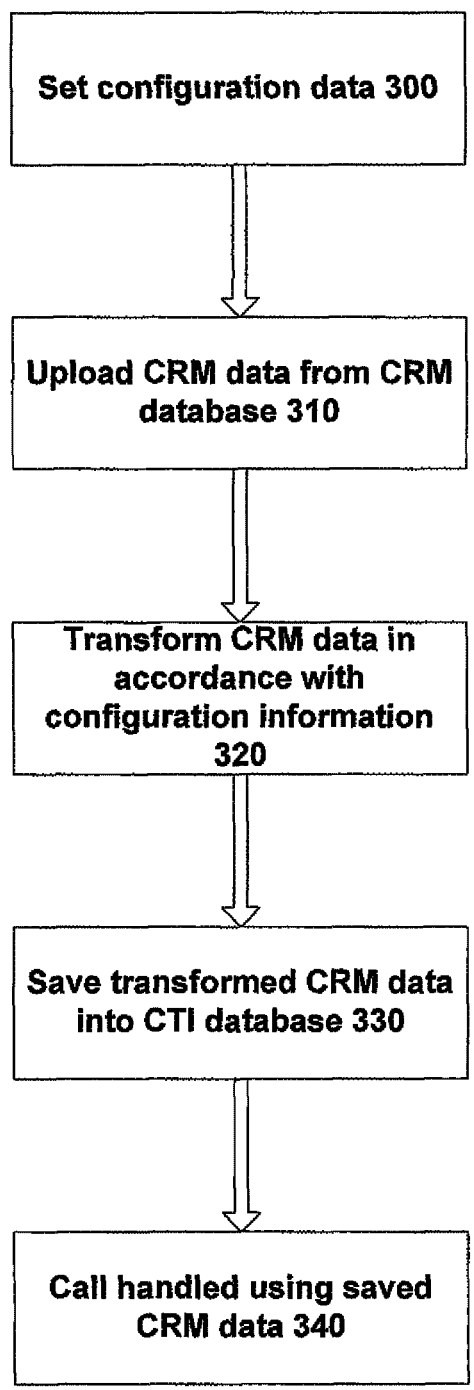
FIG. 3 is a flowchart of a method for operating the CTI system of FIG. 2 in accordance with one embodiment of the invention.

FIG. 3 is a flowchart showing in schematic form the operation of the computer-telephony system of FIG. 2 in accordance with one embodiment of the invention. The flowchart commences with setting the configuration data 273 in the CTI database 270 (300). As noted above, the CTI database 270 may be provided with a web interface for allowing the configuration data to be set by the customer itself (rather than requiring the service provider to do this). Note that although this configuration is depicted in FIG. 3 as a single initial step, it will be appreciated that the configuration data 273 may be updated and modified as required during the lifetime of the system (again using the web interface if desired).

CRM data is now uploaded from a customer CRM database 310 to the CTI database (310). As previously mentioned, this upload can be performed according to any desired time schedule, for example on a nightly basis, or possibly after any significant update of the customer CRM database 70A, 70B. Note that only selected portions of the data in CRM database 70 may be uploaded to the CTI database 270, depending upon the particular needs of the application(s) running for the customer on CTI server 80.

As part of the upload, the CRM data is transformed from a format native to the CRM database 70 for that particular customer into a standardised format for the CTI database 270 (320), and the transformed data is then saved into the CTI database (330). The transformation is performed in accordance with the stored configuration information 273 for that particular customer. As a result of this transformation, the CRM data from various customers is maintained in a common and consistent format within CTI database 270 (although CRM records 271 may be segregated by customer with CTI database 270 for security reasons). This common format greatly assists programming and application development for the CTI server 80.

Subsequently the call can then be handled using the saved CRM data (340). For example, the saved CRM data may be used to give a priority rating to the call, or to direct the call to a particular agent. The agent receiving the call may also use the CRM data for determining how to handle the call. Depending upon the particular application involved, the call may also result in the CRM data being updated (not shown in FIG. 3). This updating can then lead to the updated CRM records (for that client or customer at least) being downloaded to the CRM database 70 for that particular customer to allow their client records to be kept uptodate. (This downloading may also be based on the configuration information 273.

The skilled person will be aware of a range of possible modifications of the various embodiments described above. Accordingly, the present invention is defined by the claims and their equivalents.

The invention claimed is:

1. A method of operating a computer-telephony system, the method comprising:
providing computer-telephony support, comprising at least receiving a telephone call from a customer of a first call center at a computer-telephony system located in a telephone network facility remotely from a plurality of call centers and making information about the call available to software applications, using a computer-telephony integration interface, to the first call center with the computer-telephony system, wherein each of the plurality of call centers maintains customer relationship management (CRM) data;
uploading heterogeneous CRM data from the plurality of call centers into a computer-telephony database component of the computer-telephony system resident in the telephone network, wherein said uploading includes transforming the heterogeneous CRM data from an original format maintained by the respective call center into a standardized format for the computer-telephony database; and
handling with the computer-telephony system the telephone call for the first call center by using the transformed CRM data for the first call center in the computer-telephony database, wherein handling the telephone call comprises at least routing the telephone call to an agent of the first call center.

2. The method of claim 1, wherein said computer-telephony database further includes a configuration database describing the CRM data.

3. The method of claim 2, wherein said transforming is performed in accordance with information in the configuration database.

4. The method of claim 3, wherein said configuration database includes a web interface, and wherein said information in the configuration database can be provided or modified via the web interface.

5. The method of claim 1, further comprising uploading one or more script questions into the computer-telephony database, wherein said one or more script questions are to be used in the handling of telephone calls.

6. The method of claim 1, wherein the uploaded heterogeneous CRM data includes spreadsheet data.

7. The method of claim 1, further comprising providing a call database, wherein information about telephone calls handled by the computer-telephony system is stored into the call database.

8. The method of claim 7, further comprising using the stored information about the handling of a previous telephone call to determine the handling of a current call.

9. A computer-telephony system for providing computer-telephony support for a plurality of call centers, wherein each call center maintains customer relationship management (CRM) data, the system comprising:
a computer-telephone system located in a telephone network remotely from the plurality of call centers and adapted to receive a telephone call for a first call center and to make information about the telephone call available to software applications of the first call center using a computer-telephony integration interface;

a computer-telephony database resident in the telephone network and adapted for storing heterogeneous CRM data from the plurality of call centers in a standardized format; and an interface software module executing on a network-attached computing device and adapted for uploading heterogeneous CRM data from the plurality of call centers into the computer-telephony database;

wherein said uploading includes transforming the heterogeneous CRM data from an original format maintained by the first call center into said standardized format for the computer-telephony database;

wherein the system is configured to handle the telephone call for the first call center by using the transformed CRM data for the first call center in the computer-telephony database, wherein handling the telephone call comprises routing the telephone call to an agent of the first call center.

10. The system of claim 9, further comprising a configuration database describing the CRM data.

11. The system of claim 10, wherein said transforming is performed in accordance with information in the configuration database.

12. The system of claim 11, wherein said configuration database includes a web interface, and wherein said information in the configuration database can be provided or modified via the web interface.

13. The system of claim 9, wherein said system is configured for one or more script questions to be uploaded into the computer-telephony database for use in the handling of telephone calls.

14. The system of claim 9, wherein the uploaded CRM data includes spreadsheet data.

15. The system of claim 9, further comprising a call database, wherein information about telephone calls handled by the computer-telephony system is stored in the call database.

16. The system of claim 15, wherein the system is configured to use the stored information about handling of a previous telephone call to determine the handling of a current call.

* * * * *